United States Patent
Lipscomb et al.

(10) Patent No.: US 8,109,235 B2
(45) Date of Patent: Feb. 7, 2012

(54) PET FOOD HOLDER, PET FOOD CONTAINING MODULE AND METHOD

(75) Inventors: John M. Lipscomb, Cedarburg, WI (US); Stanley L. Suring, Cedarburg, WI (US); Jonathan D. Supanich, Cedarburg, WI (US)

(73) Assignee: Pioneer Pets Products, LLC, Cedarburg, WI (US)

( * ) Notice: Subject to any disclaimer, the term of this patent is extended or adjusted under 35 U.S.C. 154(b) by 842 days.

(21) Appl. No.: 12/025,509

(22) Filed: Feb. 4, 2008

(65) Prior Publication Data

US 2008/0184938 A1  Aug. 7, 2008

Related U.S. Application Data (60) Provisional application No. 60/887,930, filed on Feb. 2, 2007.

(51) Int. Cl.
*A01K 5/01* (2006.01)

(52) U.S. Cl. .................................................. 119/61.57

(58) Field of Classification Search ............... 119/257, 119/61.57, 61.1, 61.5, 51.5, 72, 74, 59, 72.5, 119/454, 456, 464, 475, 477; 220/400–406, 220/410, 460, 23.4, 306, 23.87, 23.89; 224/561, 224/281, 282, 564–566, 559, 549, 552, 553, 224/482, 483

See application file for complete search history.

(56) References Cited

U.S. PATENT DOCUMENTS

| | | | | |
|---|---|---|---|---|
| 1,762,589 A * | 6/1930 | Rivers | .................. | 248/230.1 |
| 1,851,847 A * | 3/1932 | Keating et al. | ............... | 119/61.1 |
| 2,841,114 A * | 7/1958 | Grant | .................. | 119/52.4 |
| 3,653,362 A * | 4/1972 | Davis | .................. | 119/61.5 |
| 3,698,594 A * | 10/1972 | Boehlert | ............... | 220/495.01 |
| 4,270,490 A * | 6/1981 | Kopp | ............... | 119/61.5 |
| 4,473,031 A * | 9/1984 | Bobeczko | ............... | 119/51.12 |
| 4,587,930 A * | 5/1986 | Trego | ............... | 119/61.57 |
| 4,800,845 A * | 1/1989 | Budd | ............... | 119/61.5 |
| 4,880,133 A | 11/1989 | Cullinane | | |
| 5,509,376 A * | 4/1996 | Tsengas | ............... | 119/51.5 |
| 5,667,119 A * | 9/1997 | Florence | ............... | 224/482 |
| 5,782,374 A * | 7/1998 | Walker | ............... | 220/23.87 |
| 5,855,184 A * | 1/1999 | Eichler et al. | ............... | 119/51.5 |
| 5,878,694 A * | 3/1999 | Irwin | ............... | 119/452 |
| 6,023,884 A | 2/2000 | Yanohara | | |
| 6,089,187 A * | 7/2000 | Gaspary | ............... | 119/61.5 |
| 6,167,840 B1 * | 1/2001 | White et al. | ............... | 119/61.53 |
| 6,189,489 B1 * | 2/2001 | Pearce | ............... | 119/477 |
| 6,196,434 B1 * | 3/2001 | Angran et al. | ............... | 224/549 |
| 6,227,510 B1 * | 5/2001 | McMullen, Sr. | ............... | 248/311.2 |
| 7,353,970 B1 * | 4/2008 | Harrison-Coats | ............... | 221/279 |
| 2005/0076565 A1 | 4/2005 | Terrell | | |
| 2006/0230676 A1 | 10/2006 | Rowe et al. | | |

* cited by examiner

*Primary Examiner* — Richard Price, Jr.

(74) *Attorney, Agent, or Firm* — Boyle Frederickson, S.C.

(57) ABSTRACT

A pet food holder and pet food containing module releasably carried by the holder that includes seeds or sprouts in a plug or pellet of food containing material in a cup of the module that germinate and grow into a plant that is edible by an animal. The holder includes a mounting arrangement used to releasably mount the holder to an object and a cradle that releasably receives the module. The mounting arrangement includes a mounting plate to which at least one mount is attached that can be a suction cup or hanger. The module includes a cover that is removed to enable germination of the seeds or sprouts. After germination, growth and being eaten by an animal, the module can be removed and replaced with a refill module.

28 Claims, 8 Drawing Sheets

PET FOOD HOLDER, PET FOOD CONTAINING MODULE AND METHOD

CROSS REFERENCE TO RELATED APPLICATION

This application claims the benefit under 35 U.S.C. §119(e) of U.S. Provisional Application Ser. No. 60/887,930, filed Feb. 2, 2007, the entirety of which is expressly incorporated by reference herein.

BACKGROUND

1. Field of the Invention

The present invention relates to accessories useful to pet owners, and more particularly, relates to a holder for holding living pet food such as grass, sprouts, or the like that is edible by pets, including such a holder equipped with living, growing pet food that preferably is at least partially self-replenishing and which can be organic.

2. Discussion of the Related Art

Animals that eat greens often prefer raw, living food over cut greens or dried or otherwise preserved greens. However, it is difficult to provide a supply of raw, living plant greens to house pets, which tend to topple plant holders in their attempts to acquire the greens therein. House pets also tend to gorge themselves in an unhealthy fashion when provided with an unlimited quantity of greens. Furthermore, gorging destroys the plant, which prevents additional greens from sprouting. It would be advantageous to be able to provide animals with a device for providing raw, living greens that is easily supplied with a small quantity of greens and is unable to be knocked over.

SUMMARY

A pet food holder for holding animal-edible food in a removable food-containing module is provided. The animal-edible pet food is retained in a cup of the module and may comprise an herbaceous plant or an annual or biennial grass, or the like. In one embodiment, the animal food may comprise a living, edible plant that is self-replenishing. In a preferred embodiment where the animal food is a living, edible plant, the plant is wheat or wheat grass that can be organic and can be self-replenishing. In another preferred embodiment, the animal-edible food need not be in plant form.

The holder includes a mounting portion having a plurality of retainers each of which preferably is or includes a suction cup for retaining the holder on a surface of an object, such as a wall of an object, a window or the like. The holder further includes a plant food cradle or carrier for holding a seeded or sprout impregnated plant food containing module. Where the module is a plant food containing module, the cup is a planting cell that contains a plug or pellet impregnated with seeds or sprouts. The cell is received in the carrier by insertion into an opening or receptacle formed in the carrier. In a preferred embodiment, engagement between the cell and carrier is provided to releasably but securely retain the cell in the carrier. In a preferred embodiment, snap fit engagement is provided between at least part of the cell and at least part of the carrier. If desired, the cell can be received in another container that attaches to the carrier or which can be part of the carrier. The cell can be removed and replaced with another cell when the supply of living and growing plant food has been used up.

In particular, the pet food holder of the present invention includes a holder that is releasably attachable to an object such as a window, aquarium, terrarium or other such object. The holder preferably includes a holder arrangement including a receiver to releasably receive a cup containing animal food and a mounting arrangement configured for releasable attachment to the object.

The receiver arrangement may comprise a cradle that is constructed and arranged to releasable receive and retain the cup. In particular, the receiver arrangement may comprise a plurality of spaced support arms configured to engage a portion of the cup. The support arms may further include a cup retaining arrangement that is configured to releasable capture a portion of the cup along the outer edge of the cup to prevent removal of the cup.

In an embodiment constructed in accordance with the present invention, the retaining arrangement may comprise a plurality of spaced, outwardly extending retaining fingers that are adapted to overlie an outer edge of the cup. Accordingly, the outer edge of the cup is captured between a portion of one of the support arms and at least one of the retainer fingers.

The retainer fingers of one of the support arms may be configured to oppose the retainer fingers of another of the support arms. As such, the retainer fingers of the one of the support arms may engage a top surface of the cup adjacent to or along one edge of the cup, and the retainer fingers of the other of the support arms may engage the top surface of the cup adjacent to or along the opposite side. Thus, the cup is releasably retained therein.

The mounting arrangement of the present invention may comprise a mounting plate having a plurality of mounts that are designed to releasably engage a surface of the object. The mounts may comprise, for example, suction cups configured to engage a planar, nonporous surface of the object. The mounting plate may further include a plurality of hole pairs. The holes may releasable receive one of the suction cups to thereby provide engagement between the suction cups and the mounting plate.

The present invention also contemplates a method of providing pet food to a pet using a pet food holder in combination with an edible food containing module. In a preferred embodiment, the method comprises providing a pet food holder that is releasably attachable to an object such as a window, aquarium, terrarium or the like that includes a cradle. The holder further includes a pet food containing module that is releasable received in the cradle and comprises a cup, a plug or pellet of growing material in which seeds or sprouts of an edible plan are embedded or impregnated in the cup and including a cover configured to releasably overly the cup. The method further includes the step of attaching the pet food holder to the object, removing the cover to allow for germination of the seeds or spouts and germinating the seeds or spouts.

The method may further comprise the step of watering the seeds or sprouts or growing an edible plant in the cup to a height where an animal can eat a portion of the plant. In addition, the method may also include replacing the pet food containing module with another such pet food containing module and removing the cover of the second pet food containing module to permit germination thereof.

BRIEF DESCRIPTION OF THE DRAWINGS

Preferred exemplary embodiments of the invention are illustrated in the accompanying photographs, in which like reference numerals represent like parts throughout, and in which.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-7 illustrate a preferred embodiment of a pet food holder 20 that is constructed and arranged to releasably attach to an object 22, such as a window, terrarium, aquarium or the like, while holding a food containing module 24 in a manner that makes it easy for an animal 26 (FIG. 3) to eat from the module 24. The food containing module 24 includes food 28 housed in a cup 30 that is releasably received and retained in the holder 20 and that has a removable cover 32 overlying the food 28 in the cup 30.

The holder 20 includes a mounting arrangement 34 that facilitates attachment to the object 22 and a receiver arrangement 36 that is constructed and arranged to releasably receive and positively retain the food containing module 24. The mounting arrangement 34 includes a mounting plate 38 that is disposed at an angle relative to the receiver arrangement 36. The receiver arrangement 36 includes a cradle 40 with the cradle 40 and the mounting plate 38 defining a generally L-shaped stackable or nestable holder frame 42 that is formed as a single unit of substantially homogeneous construction. In a preferred embodiment, the holder frame 42 is formed of a plastic that is molded, such as by plastic injection molding.

As a result, the holder frame 42 produces a holder 20 that is advantageously easy to disinfect, such as by washing or the like. In addition, the holder frame 42 can be made of an antibacterial material, such as TRICLOSAN or the like, which is impregnated or infused in the plastic of the holder frame 42 to inhibit bacterial growth.

As previously discussed, the food containing module 24 includes a cup 30 that holds food 28 within it with the food 28 being of an animal edible composition. In a preferred embodiment, the food 28 is received within the cup 30 and enclosed by cover 32 that seals or otherwise retains the food within the cup 30. In a preferred embodiment, such a cover 32 can be configured to air tightly or hermetically seal the food 28 within the cup 30, advantageously helping to maximize or optimize shelf life, including when the food containing module 24 is packaged with the holder 20 and awaiting sale or shipment. Such a cover 32 can be made of a plastic, such as a plastic film, or another type of material that can be adhesively attached and/or heat sealed to the cup 30 about the periphery of its opening 44.

The cup 30 has a body 46 formed of plastic with the body 46 including a plurality of pairs of opposed side walls 48, 50 that extends downwardly from the opening 44 to a bottom wall 52 defining a food-receiving chamber 54 therein. The bottom wall 52 can be of perforate construction, such as where it is desired to provide drainage from the interior of the cup 30. The top of the cup 30 includes an outwardly extending flange 56 about the periphery of the opening 44. Where the cup 30 is of a generally square configuration, such as is shown in FIGS. 1-6, the flange 56 includes two pairs of opposed and outwardly extending flange legs 58, 60 that each engage part of the receiver arrangement 36, namely the cradle 40, when the cup 30 is inserted into the holder 20.

In one preferred embodiment where the food is an edible plant, the cup 30 is a planting cell that is of rectangular or square cross-sectional configuration or shape. Such planting cells are advantageously stackable, economical, easy to use, and readily available. The planting cell cup 30 includes a cover 32 that seals and retains edible plant food in the cup 30 until the cover is removed.

Figure 1:
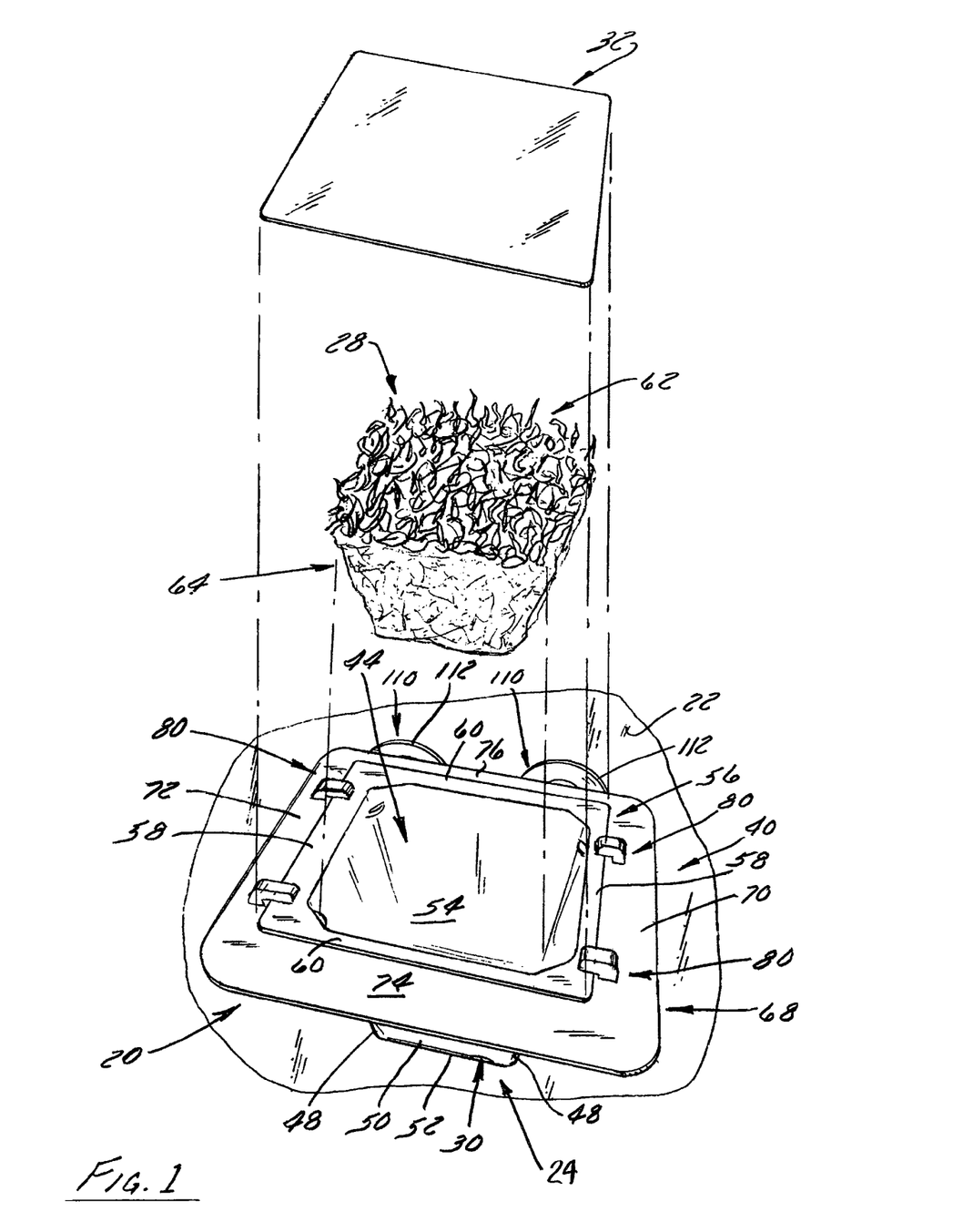
FIG. 1 is an exploded perspective view of a preferred embodiment of an animal food holder assembly and animal food containing module constructed in accordance with the present invention with the holder attached to a pane of glass.
Figure 2:
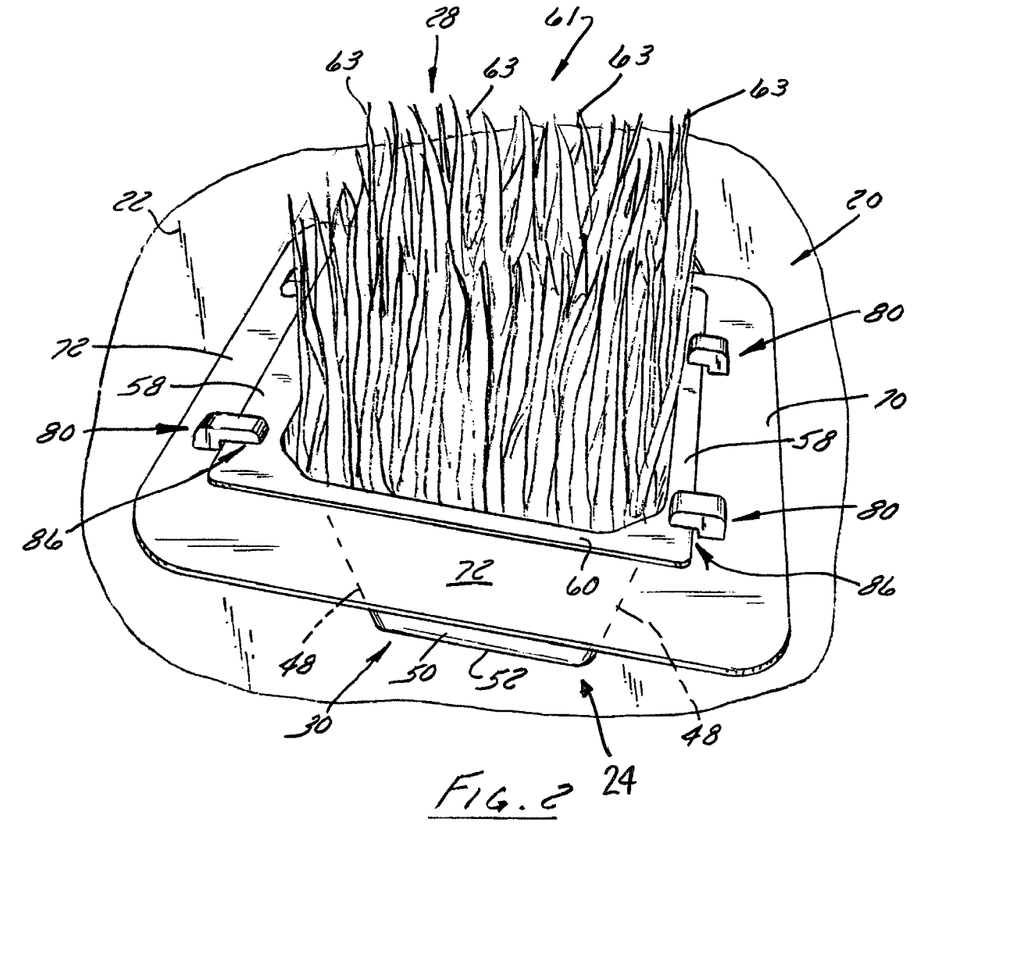
FIG. 2 is an assembled perspective view of the animal or pet food holder assembly.

The animal food 28 received in the cup 30 shown in FIGS. 1-4 is in the form of an edible plant or plant mass 62. In a preferred embodiment, the animal food 28 is a mass of plants 62 such that there is a least a plurality of pairs, i.e., it least three, of individual plants 62 that are edible, living and able to grow so as to be at least partially self-replenishing. Initially, the plants 62 are disposed in a plug or pellet of growing material 64 with each plant 62 either being in the form of a seed or sprout embedded or otherwise impregnated in the growing material. In a preferred embodiment, the growing material 64 is a peat pellet that provides a growing matrix for at least a plurality of pairs of seeds or sprouts that germinate and grow, such as is shown in FIG. 2, when the cover 32 is removed.

If needed, water is added after the cover 32 is removed to facilitate germination of the seeds or sprouts (FIGS. 1 and 4) into mature or grown plants 61 (FIGS. 2 and 3) that have leaves 63 projecting upwardly from the cup 30 and holder 20. In a preferred embodiment, the growing material 64 and/or seeds or sprouts in the growing material 64 is watered after removal of the cover 32.

Such a food containing module 24 advantageously therefore comes in prepackaged form. Where equipped to provide edible plant food, the module comes in prepackaged form either as a ready-to-grow module 24 that is inserted into the holder 20 prior to shipment and/or sale or a ready-to-grow refill that can be inserted into the holder 20 to replace a module 24 whose supply of food 28 has been exhausted (such as by being eaten by the animal). Where the cover 32 seals the cup 30, it prevents germination and growth of the seeds or sprouts in the growing material 64 until the cover 32 is removed or its seal is broken.

The seeds or sprouts provide growing, living pet or animal food once germinated. The seeds or sprouts grow into an edible plant that with the seeds or sprouts being that of a grass that can be organic. For example, in a preferred embodiment, the cup 30 is a planting cell of a pet or animal food containing module 24 that has a peat pellet 64 that is impregnated with wheat seeds or sprouts that grow into wheatgrass 63 upon germination. Such wheatgrass 63 can be organic. After germination and growth of about four or five days a sufficient amount of wheatgrass 63 is produced that will provide edible food for an animal, such as a cat 26 as is depicted in FIG. 3.

Figure 3:
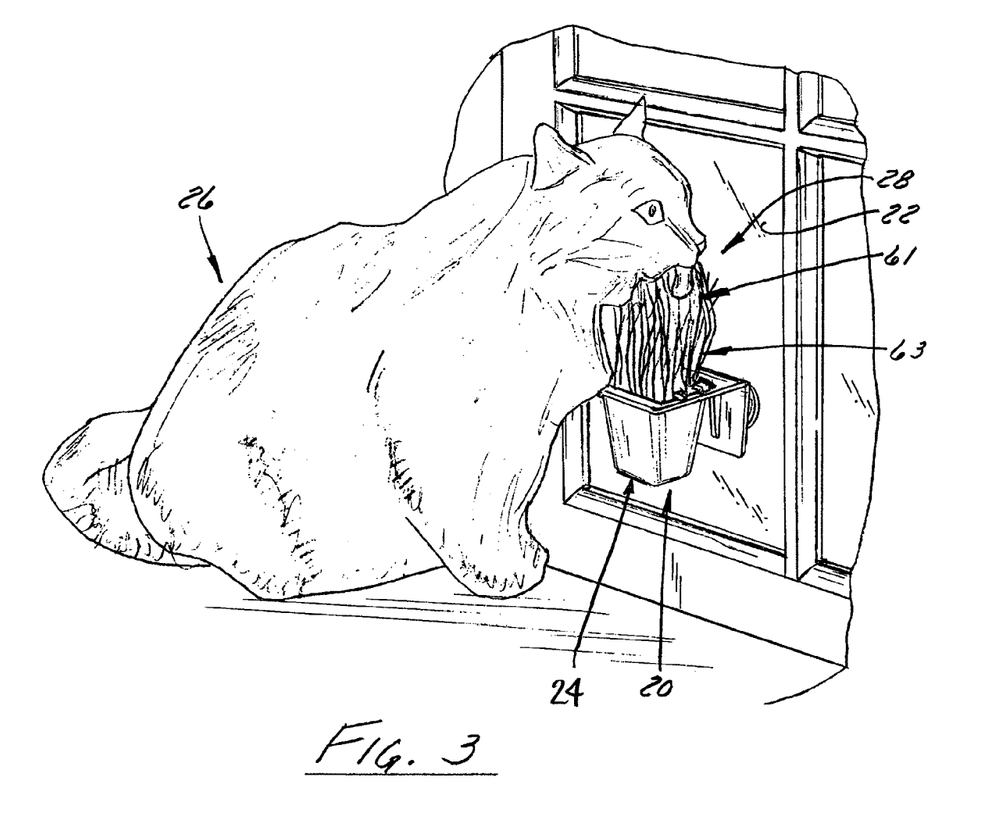
FIG. 3 is a top perspective view of the embodiment shown in FIG. 2.
Figure 4:
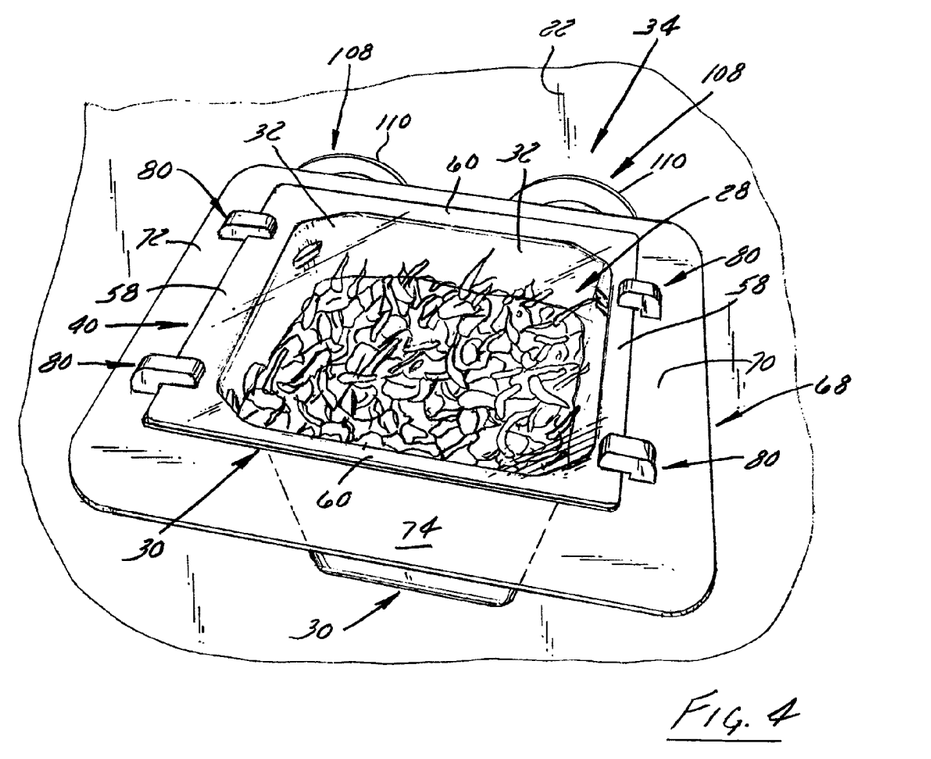
FIG. 4 is a top view of the embodiment shown in FIG. 2 without a seed cell in the opening.

As is shown in FIG. 3, the blades of wheatgrass 63 extend sufficiently high above the cup 30 that the cat 26 can easily eat the wheatgrass 63. Such living and growing food advantageously not only provides valuable nutrients to the cat 26, but also is an excellent source of fiber. Although wheatgrass 63 is preferred, other types of plants, including cereal crop type grasses like wheat, rye, buckwheat, triticale and the like can be grown in the same manner.

Referring once again to the holder frame 42, the frame 42 includes an elbow 66 joining the module-receiving cradle 40 and the holder mounting plate 38. The cradle 40 includes a module support platform 68 having a least a pair of spaced apart and outwardly extending arms 70, 72 defining a space between which a bottom portion of the cup 30, including at least part of its chamber 54, is received. Each support arm 70 and 72 is flat or generally planar, spaced apart so as to each underlie a corresponding one of the flange legs 58 or 60 when a cup 30 is placed in the holder 20. In addition, there is a flat or generally planar tie beam 74 that extends transversely between the support arms 70, 72 at or adjacent an outer end of the arms and a flat or generally planar support ledge 76 that extends transversely between the arms 70, 72 at or adjacent the frame elbow 66. Where equipped with a tie beam 74 and/or support ledge 76, the top surface of the tie beam 74 and the support ledge 76 also underlie a corresponding one of the flange legs 60 or 58 when the cup 30 is placed in the holder 20.

Therefore, as is depicted in the preferred embodiment shown in FIGS. 1-4, the cradle 40 of the holder 20 encircles and underlies the flange 56 of a cup 30 received in the holder 20. The support arms 70, 72, tie beam 74 and support ledge 76 define a cup receiving opening 78 in which at least a bottom portion of the cup 30 that defines at least a portion of the chamber 54 extends through.

Although not shown, the holder frame 42 can include a bowl extending from the cradle 40 that underlies the bottom of the cup 30 so as to completely or substantially completely enclose the bottom of the cup 30, if desired. Where the holder frame 42 is equipped with a bowl, the bottom of the cup 30 nests within the bowl such that the bowl captures any excess moisture preventing it from dripping and falling onto the floor or the like.

To more positively yet releasably retain the cup 30 in the holder 20, there can be at least one upraised cup retainer finger 80 extending from at least one of the support arms 70, 72, the outer tie beam 74, and/or support ledge 76. For example, in the embodiment shown in FIGS. 1-7, there is a plurality of opposed retainer fingers 80 that extend outwardly from a portion of the cradle 40. As is shown in FIGS. 1-7, there is at least one retainer finger 80 that extends outwardly from each support arm 70, 72 in a manner such that the fingers 80 are in opposition.

Figure 5:
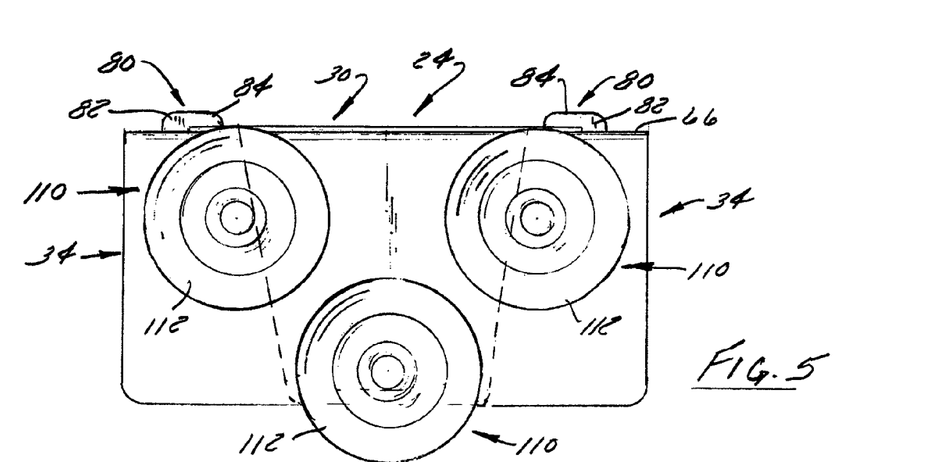
FIG. 5 is a fragmentary side cross-sectional view of part of a planting cell cup and planting cell carrier depicting releasable interlocking arrangement capable of releasably keeping the cell seated in the carrier.
Figure 8:
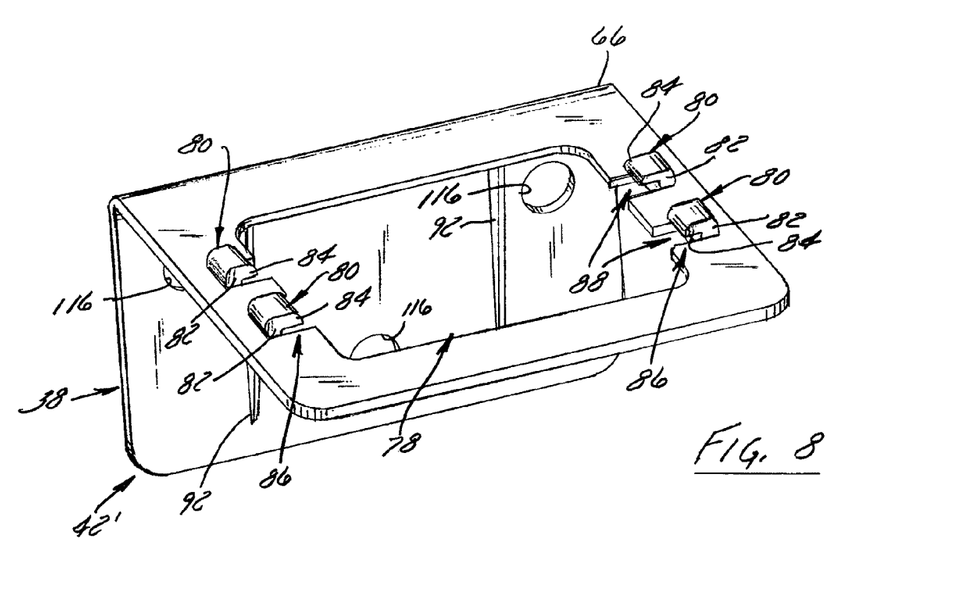
FIG. 8 is a top perspective view of a second preferred embodiment of a pet food holder assembly frame.

With specific reference to FIGS. 5 and 8, each finger 80 is a generally L-shaped hook defined by a base or an upright 82 that extends outwardly from a corresponding support arm 70 or 72 from which a hook end 84 projects defining a cup flange receiving channel 86 (FIG. 8) generally between the hook end 84 and the arm 70 or 72. Even where there is a pocket or clearance 88 (FIG. 9) in or underlying the corresponding arm 70 or 72, such as to facilitate stacking of multiple holder frames 42, a flange 56 of a cup 30 inserted into the holder 20 is releasably captured between the hook end 84 and a portion of the corresponding adjacent support arm 70 or 72 extending on either side of the finger 80. In one preferred embodiment, the opposed fingers 80 provide a "snap in place" or snap fit retention of a cup 30 received in the holder 20.

Figure 9:
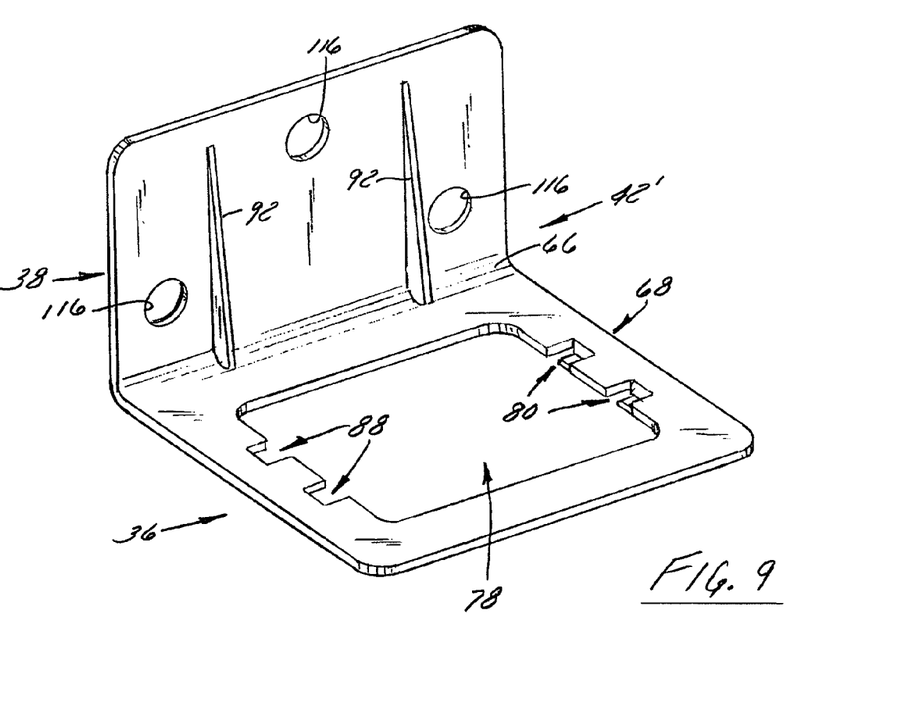
FIG. 9 is a bottom perspective view of the pet food holder assembly frame of FIG. 8.

As is best shown in the embodiment of the holder frame 42' shown in FIGS. 8 and 9, there is a pair of spaced apart ribs 90, 92 extending along the mounting plate 38 to at least the elbow 66 to help transfer the load of a food containing module 24 on the cradle 40 to the ribs 90, 92 and the mounting plate 38 thereby strengthening the frame 42'. If desired, each rib 90, 92 can terminate at or adjacent the elbow 66 so as to be in contact with or extend to at least a portion of the cradle 40 adjoining a bottom surface of the support ledge 76. As is best shown in FIG. 9, each rib 90, 92 are integrally formed with the rest of the frame 42'.

Figure 10:
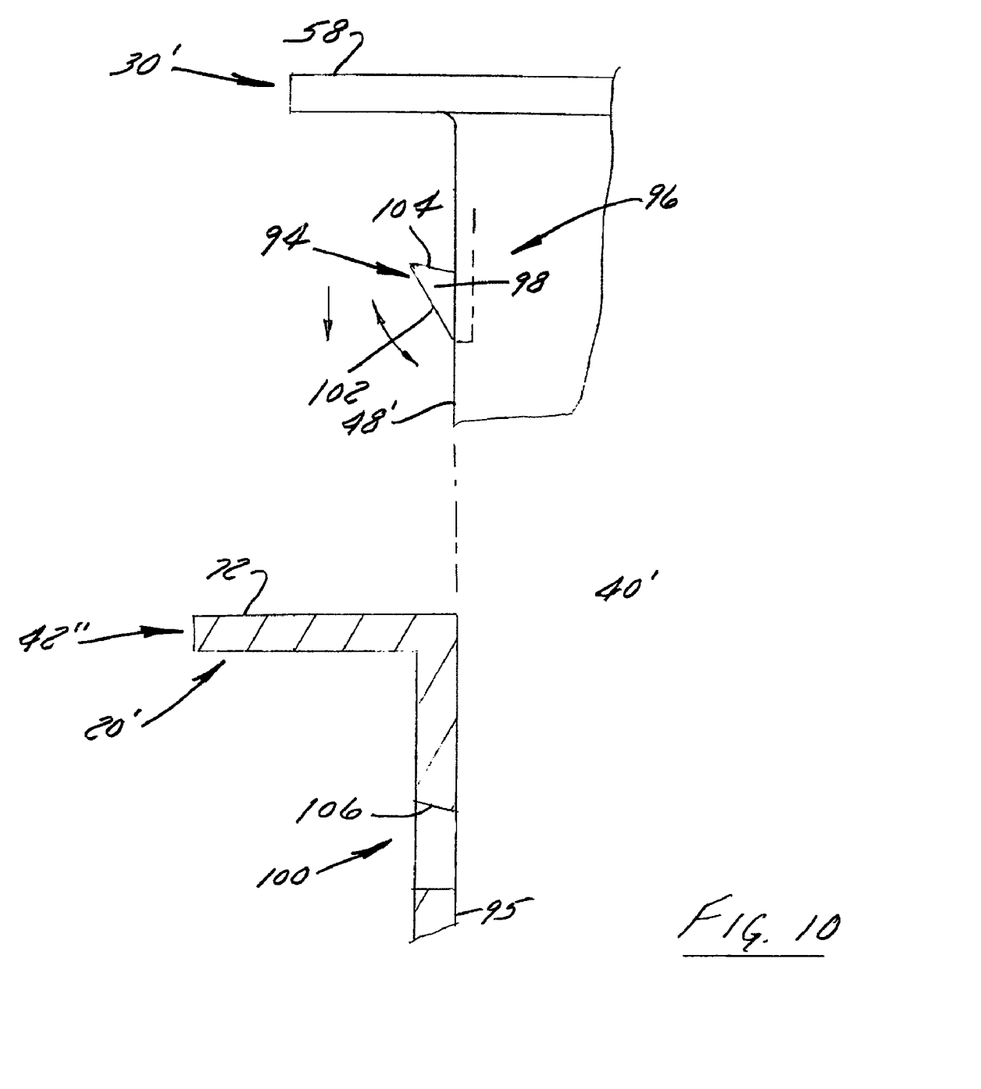
FIG. 10 is a cross sectional view of the cup engaging the pet food frame.

With additional reference to FIG. 10, the cup 30' can be configured so as to engage with part of the pet food holder frame 42" to releasably yet firmly retain the cup 30' in place. In the embodiment depicted in FIG. 10, the cup 30' has a side wall 48' with an integrally formed tab 94 of a releasable latching mechanism 96 that is resiliently biased outwardly so as to engage a downwardly extending latch flange or wall 95 of the cradle 40' in a manner that releasably opposes disengagement. The tab 94 of the releasable latch 96 preferably has a tooth or pawl 98 that is receivable in a complementary retainer pocket 100 formed in the latch flange or wall 95. As is shown in FIG. 10, the tooth or pawl 98 has an angled or inclined surface 102 that engages with the inner surface of the latch flange or wall 95 during insertion of the cup 30' into the cup receiving opening 78 in the holder. As a result of this engagement, the tab 94 is urged inwardly until the tooth or pawl 98 is received in the pocket 100 in the latch flange or wall 95. Abutment between a flat surface 104 of the tooth or pawl 98 and a flat 106 that defines part of the pocket 100 prevents inadvertent disengagement. Manual pressure can be applied to urge the tooth or pawl 98 out of the pocket 100 to disengage the cup 30' from the cradle 40' when it is desired to remove and replace the cup 30'.

Figure 6:
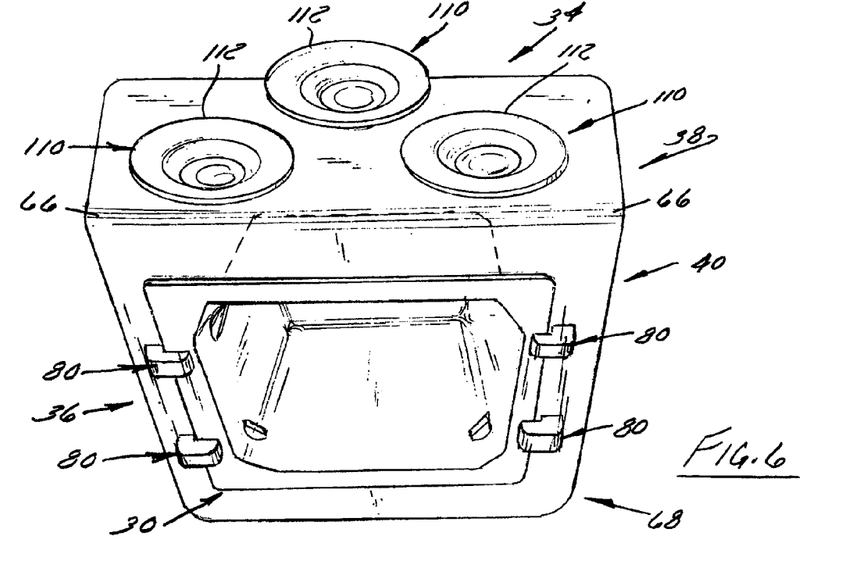
FIG. 6 is a perspective view of sprouts after a short period of growth.
Figure 7:
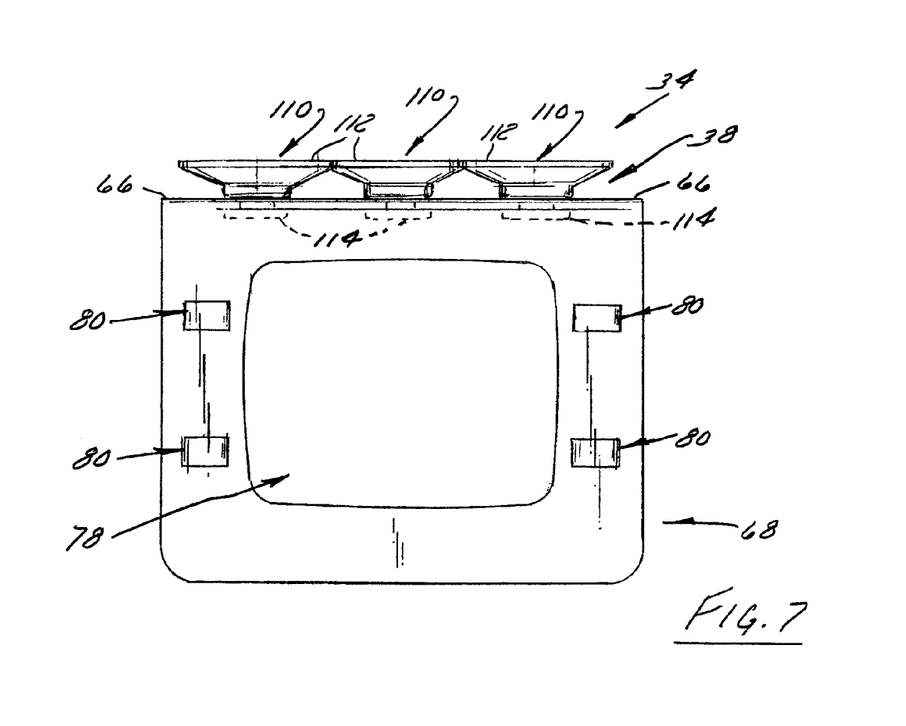
FIG. 7 is a second perspective view of sprouts after a longer period of growth.

With reference to FIGS. 5-7, the mounting arrangement 34 is formed by a plurality of pairs of mounts 110 that extend outwardly from the mounting plate 38 of the holder frame 42. The mounts 110 are arranged in a triangular configuration with a centrally disposed mount 110 located lower than a mount 110 located on either side of it thereby facilitating positive attachment of the holder 20 to object 22. In the embodiment shown in FIGS. 1-7, each mount 110 is a suction cup 112 that has a round base 114 (FIG. 7) press-fit into a complementary bore 116 (FIGS. 8 and 9) in the mounting plate 38.

Figure 11:
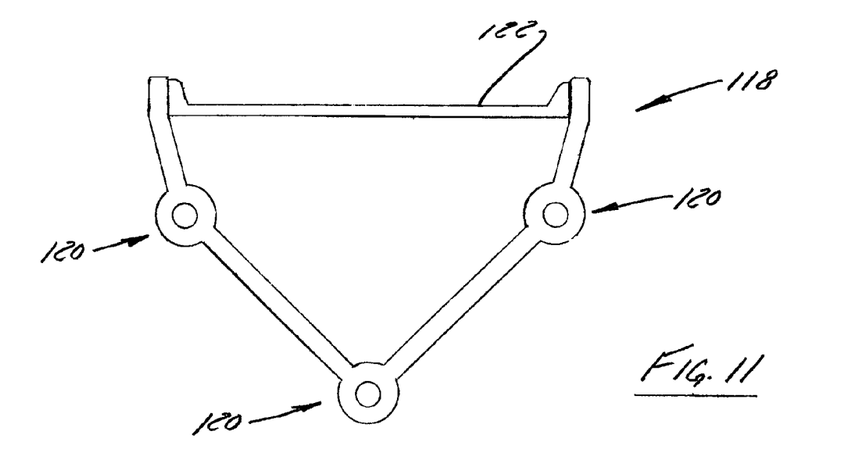
FIG. 11 is a cross sectional view of the hanger.

With additional reference to FIG. 11, if desired a different mounting arrangement 34' can be employed. In the mounting arrangement 34' shown in FIG. 10, the three suction cups 112 have been replaced with a hanger 118 that includes a plurality of pairs of snaps 120 or the like, each of which are releasably received in a corresponding one of the bores 116 in the mounting plate 38. Where equipped with a hanger 118, a hook 122 of the hanger 118 can be placed over the side edge of an object (not shown in FIG. 11) in a manner where the weight of the holder 20 and food containing module 24 cause the entire assembly to be retained by or otherwise remain attached to the object. The hook 122 of the hanger 118 can also be configured to engage a wire cage, such as a birdcage or an animal cage. For example, the hook 122 can be configured to be narrower than what is shown in FIG. 11 or the hanger 118 can be configured with a plurality of narrow hooks, each of which can be inserted through the side of a wire cage or the like.

Figure 12:
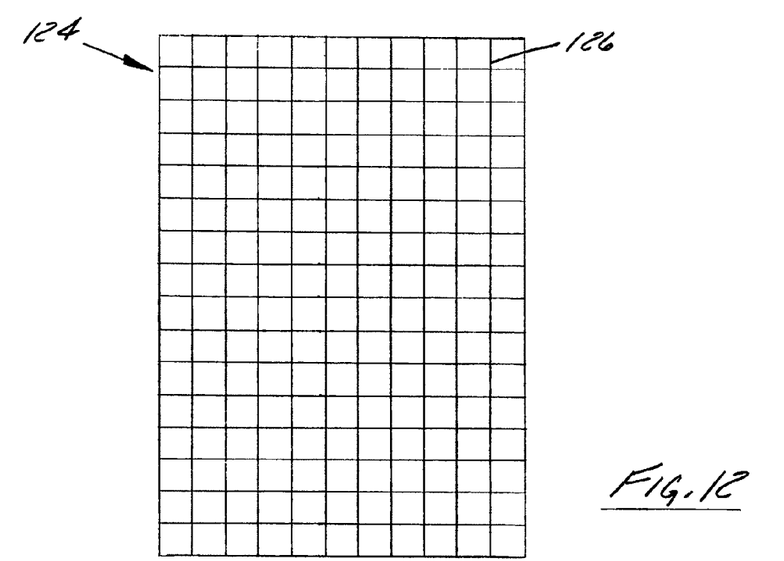
FIG. 12 is a plan view of the foliage anchor arrangement.

With additional reference to FIG. 12, the pet food holder 20 can include a foliage anchor arrangement 124 used to help keep the pet food 28 in place to prevent a pet 26 eating the food 28 from pulling the food 28 out of the cup 30. The foliage anchor arrangement 124 can also be used to help releasably retain the cup 30 in the cradle 40 by helping to prevent a pet 26 eating the food 28 from inadvertently pulling the cup 30 and the food 28 together as a unit out of the holder 20.

The foliage anchor arrangement 124 includes a perforate foliage anchor 126 that releasably attaches to an anchor receiver that preferably is integrally formed of a portion of the cradle 40 of the holder 20. In the embodiment shown in FIG. 12, the foliage anchor 126 is or includes a flat panel or segment of mesh or screen that overlies the top of the cup 30 and engages at least one cup retainer finger 80 of each support arm 70, 72. The foliage anchor 126 has holes of a size large enough to permit sprouts, leaves and the like to grow upwardly and pass through the holes, but small enough that the surrounding wires or mesh that form the anchor 126 will engage with at least some of the growing sprouts, leaves, and/or underlying root system to prevent them from being pulled through the anchor 126. In a preferred embodiment, ⅛" by ⅛" screen or mesh is used with the screen or mesh segment 126 having a width and length that is larger than the top of the cup 30.

In use, the pet food holder 20 is attached by its mounts 110 to an object 22 that can be a pane of glass, such as is found in a window, in a manner the same as or like that depicted in FIG. 3. Before or after being attached to the object 22, the cover 32 of the food containing module 24 is removed thereby enabling wheat seeds or sprouts embedded or impregnated in the plug or pellet of growing material 64 in the cup 30 of the module 24 to germinate. The plug or pellet of growing material 64 is watered thereby facilitating germination of the seeds or sprouts and ultimately causing them to grow. With specific reference to FIG. 3, after at least two or three days, blades of wheat grass 63 appear.

When the blades of wheat grass 63 become long enough, a cat 26 in the vicinity of the pet food holder 20 is able to eat at least a plurality of blades of wheat grass 63 thereby providing nutrition and fiber to the cat 26. Advantageously, even as the cat 26 eats blades of wheat grass 63, stems of eaten blades as well as other blades continue to grow thereby continuing to provide food for the cat 26 for at least one week after cover removal and germination. In a preferred embodiment, a sufficient amount of growing material 64, along with enough seeds or sprouts, are provided in a food containing module 24 to provide food for the cat 26 for a least two weeks after cover removal and germination before being exhausted.

Once exhausted, the used up food containing module 24 is removed from the cradle 40 of the pet food holder 24 and a refill module 24 containing the same or different pet food is snapped into the cradle 40. Such a refill module 24 also includes a plug or pellet 64 impregnated with seeds or sprouts of an edible plant that also can be wheat. Once again, the cover 32 is removed from the refill module 24 and, to the extent necessary, water is added to the plug or pellet 64 in the cup 30, e.g. planting cell, of the module 24. In this manner, food containing refills modules 24 are removed when exhausted and replaced with new refill modules 24 as is needed to provide an ongoing supply of food to the cat 26.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

It is claimed:

1. A pet food holder comprising a holder arrangement that is releasably attachable to an object and that carries animal food, the holder arrangement comprising (a) a receiver arrangement that releasably receives a cup containing the animal food, and (b) a mounting arrangement that enables releasable attachment to the object; and
wherein the receiver arrangement comprises a cradle that includes a plurality of spaced apart support arms that each engage a portion of the animal food containing cup releasably retaining the animal food containing cup received in the cradle.

2. The pet food holder of claim 1 wherein the cradle is configured for snap fit engagement with the animal food containing cup.

3. The pet food holder of claim 2 wherein the holder arrangement is comprised of plastic.

4. The pet food holder of claim 2 wherein each support arm further includes a cup retainer arrangement that releasably engages a portion of the cup in a manner that prevents removal of the cup.

5. The pet food holder of claim 4 wherein each cup retainer arrangement comprises a plurality of spaced apart and outwardly extending cup retainer fingers that overlie an outer edge of the cup such that the outer edge of the cup is captured between a portion of one of the support arms and at least one of the cup retainer fingers extending outwardly therefrom.

6. The pet food holder of claim 5 wherein the plurality of cup retainer fingers of one of the support arms opposes the plurality of cup retainer fingers of the other one of the support arms such that the plurality of cup retainer fingers of the one of the support arms engages a top surface of the cup adjacent or along one side edge of the cup and the plurality of cup retainer fingers of the other one of the support arms engages the top surface of the cup adjacent or along an opposite side edge of the cup thereby releasably retaining the cup.

7. The pet food holder of claim 1 wherein the holder arrangement is generally L-shaped.

8. The pet food holder of claim 7 wherein the generally L-shaped holder arrangement is stackable such that a plurality of pairs of generally L-shaped holder arrangements can be stacked one on top of another.

9. The pet food holder of claim 1 wherein the mounting arrangement further comprises three spaced apart suction cups.

10. The pet food holder of claim 1 wherein the animal food carried by the holder arrangement comprises an edible plant.

11. The pet food holder of claim 10 wherein the animal food carried by the holder arrangement comprises an herbaceous plant or an annual or biennial organic grass.

12. The pet food holder of claim 10 wherein the animal food carried by the holder arrangement comprises a living edible plant that is self replenishing.

13. The pet food holder of claim 1 wherein the animal food containing cup further comprises a removable cover.

14. The pet food holder of claim 13 wherein the removable cover comprises a plastic film sealed about a periphery of an opening in the cup.

15. The pet food holder of claim 14 wherein the animal food comprises wheat grass seed or wheat grass sprouts disposed in growing material in the cup that germinates upon removal of the film and watering.

16. A pet food holder comprising a holder arrangement that is releasably attachable to an object and that carries animal food; and wherein the holder arrangement comprises (a) a receiver arrangement that releasably receives a cup containing the animal food, and (b) a mounting arrangement that enables releasable attachment to the object; and wherein the mounting arrangement comprises a mounting plate carrying a plurality of mounts that each releasably engages a surface of the object.

17. The pet food holder of claim 16 wherein each one of the plurality of mounts comprises a suction cup that engages a generally planar and substantially nonporous surface of the object.

18. The pet food holder of claim 17 wherein the mounting plate has a plurality of pairs of holes in which a portion of one of the plurality of suction cups is releasably received such that engagement between the portion of each one of the plurality of suction cups received in a corresponding one of the holes and the mounting plate releasably attaches the suction cup thereto.

19. The pet food holder of claim 16 wherein the receiver arrangement comprises a cup retainer arrangement that releasably engages a portion of the cup in a manner that prevents removal of the cup.

20. The pet food holder of claim 19 wherein the cup retainer arrangement comprises at least one finger.

21. A pet food holder in combination with an edible pet food containing module comprising:

a holder arrangement that is releasably attachable to an object and that carries the edible food containing module, the holder arrangement comprising a mounting arrangement that includes a mounting plate and a food containing module cradle carried by the mounting plate; and wherein the food containing module comprises a planting cell comprising edible plant food that includes growing material containing seeds or sprouts of an edible plant received in a cup having a removable cover sealing the planting cell preventing germination of the seeds or sprout in the growing material until the cover is removed; and wherein the cradle is configured so the planting cell snaps-in-place into the cradle.

22. The pet food holder in combination with the edible food containing module of claim 21 wherein the cradle is configured to releasably capture a portion of the cup of the planting cell along an outer edge of the cup of the planting cell when the planting cell is snapped-in-place into the cradle.

23. The pet food holder in combination with the edible food containing module of claim 22 wherein the cradle comprises a plurality of spaced apart fingers that each overlie a portion of a flange of the cup of the planting cell when the planting cell is snapped-in-place into the cradle.

24. The pet food holder in combination with the edible food containing module of claim 21 wherein the seeds or sprouts comprise wheat seeds or wheat sprouts that germinate upon removal of the cover from the planting cell.

25. The pet food holder in combination with the edible food containing module of claim 21 wherein the cradle comprises first and second opposed pairs of spaced apart fingers that each engage a respective portion of a corresponding flange of the planting cell when the planting cell is snapped-in-place into the cradle.

26. A pet food holder in combination with an edible pet food containing module comprising:

(a) the pet food holder comprising (1) a module-holding cradle configured to encircle and underlie a portion of the edible pet food containing module so as to releasably receive and retain the edible pet food containing module, and (2) a mounting arrangement configured to releasably mount the holder to a generally planar, generally vertically extending surface;

(b) the edible pet food containing module comprising (1) a cup releasably received in the cradle and having at least one wall defining an opening and a bottom defining with the at least one wall a food-receiving chamber therein, (2) a plug or pellet of growing material, (3) a plurality of seeds or sprouts disposed in the growing material, and (3) a cover that overlies and seals the opening; and wherein the cradle comprises a pair of spaced apart and opposed retainer arrangements releasably capturing part of the cup in the cradle along a respective outer edge of the cup; and wherein removal of the cover enables germination of the seeds or sprouts in the food-receiving chamber when water is added to the growing material.

27. The pet food holder in combination with the edible food containing module of claim 26 wherein each retainer arrangement comprises a pair of spaced apart and outwardly extending cup retainer fingers overlying part of the cup.

28. The pet food holder in combination with the edible food containing module of claim 26 wherein the plug or pellet of growing material comprises a peat pellet.

* * * * *

UNITED STATES PATENT AND TRADEMARK OFFICE
CERTIFICATE OF CORRECTION

| | | |
|---|---|---|
| PATENT NO. | : 8,109,235 B2 | Page 1 of 1 |
| APPLICATION NO. | : 12/025509 | |
| DATED | : February 7, 2012 | |
| INVENTOR(S) | : John M. Lipscomb et al. | |

It is certified that error appears in the above-identified patent and that said Letters Patent is hereby corrected as shown below:

ON THE FACE

(73) Assignee:

Please amend the assignee to read:

-- Pioneer Pet Products, LLC --

Signed and Sealed this

Seventeenth Day of April, 2012

David J. Kappos
*Director of the United States Patent and Trademark Office*